(12) United States Patent
Strobel et al.

(10) Patent No.: US 11,218,188 B2
(45) Date of Patent: *Jan. 4, 2022

(54) METHODS, DEVICES AND SYSTEMS OF SUPPORTING DISCONTINUOUS OPERATION IN COMMUNICATION SYSTEMS USING VECTORING (71) Applicant: Lantiq Beteiligungs-GmbH & Co. KG, Neubiberg (DE)

(72) Inventors: Rainer Strobel, Munich (DE); Vladamir Oksman, Morganville, NJ (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,746

(22) Filed: Nov. 27, 2019

(65) Prior Publication Data

US 2020/0244308 A1 Jul. 30, 2020

Related U.S. Application Data

(63) Continuation of application No. 15/819,511, filed on Nov. 21, 2017, now Pat. No. 10,567,037, which is a continuation of application No. 14/890,173, filed as application No. PCT/EP2015/059736 on May 13, 2014, now Pat. No. 9,838,075.

(Continued)

(51) Int. Cl.
*H04J 7/00* (2006.01)
*H04B 3/32* (2006.01)
*H04M 11/06* (2006.01)
*H04M 3/00* (2006.01)

(52) U.S. Cl.
CPC .............. *H04B 3/32* (2013.01); *H04M 3/007* (2013.01); *H04M 11/062* (2013.01); *Y02D 30/50* (2020.08)

(58) Field of Classification Search
None
See application file for complete search history.

(56) References Cited

U.S. PATENT DOCUMENTS 8,537,655 B2 9/2013 Nuzman et al.
9,100,506 B2 8/2015 Chow et al.
(Continued)

FOREIGN PATENT DOCUMENTS

CN 102136852 A 7/2011
EP 2466757 A1 6/2012
(Continued)

OTHER PUBLICATIONS

"G.fast: Low Power Modes—Continued" Source: BT. Question 4a/SG15. ITU—Telecommunication Standardization Sector. TD2013-03-Q4-067. Study Group 15. Red Bank, New Jersey, Mar. 18-22, 2013.

(Continued)

*Primary Examiner* — Clemence S Han
(74) *Attorney, Agent, or Firm* — 2SPL Patent Attorneys PartG mbB; Yong Beom Hwang (57) ABSTRACT

Methods, devices and techniques are disclosed where vectoring is adapted to lines becoming inactive and active, for example in a discontinued operation. In some embodiments, the vectoring is modified based on already present coefficients.

14 Claims, 8 Drawing Sheets

Related U.S. Application Data (60) Provisional application No. 61/822,478, filed on May 13, 2013.

(56) References Cited

U.S. PATENT DOCUMENTS

| | | | | |
|---|---|---|---|---|
| 9,838,075 | B2* | 12/2017 | Strobel | H04M 11/062 |
| 10,567,037 | B2* | 2/2020 | Strobel | H04M 3/007 |
| 2003/0086514 | A1 | 5/2003 | Ginis et al. | |
| 2009/0270038 | A1 | 10/2009 | Clausen | |
| 2012/0155618 | A1* | 6/2012 | Hart | H04M 11/062 |
| | | | | 379/27.01 |
| 2013/0215951 | A1* | 8/2013 | Nuzman | H04B 3/487 |
| | | | | 375/227 |
| 2014/0254791 | A1* | 9/2014 | Wei | H04M 11/062 |
| | | | | 379/406.01 |
| 2014/0334283 | A1 | 11/2014 | Chang et al. | |
| 2015/0071336 | A1* | 3/2015 | Kerpez | H04M 3/2209 |
| | | | | 375/227 |
| 2015/0326278 | A1* | 11/2015 | Maes | H04B 3/32 |
| | | | | 370/201 |
| 2015/0326380 | A1 | 11/2015 | Verbin et al. | |
| 2018/0212647 | A1 | 7/2018 | Strobel et al. | |

FOREIGN PATENT DOCUMENTS

| | | |
|---|---|---|
| JP | 2012-531153 A | 12/2012 |
| WO | 2012/102917 A1 | 8/2012 |

OTHER PUBLICATIONS

International Search Report and Written Opinion of PCT/EP2014/059736 dated Sep. 29, 2014.
Notice of Allowance dated Aug. 10, 2017 for U.S. Appl. No. 14/890,173.
Non-Final Office Action dated May 5, 2017 for U.S. Appl. No. 14/890,173.
Notice of Allowance dated Oct. 18, 2019 for U.S. Appl. No. 15/819,511.
Non-Final Office Action dated Apr. 16, 2019 for U.S. Appl. No. 15/819,511.

* cited by examiner

METHODS, DEVICES AND SYSTEMS OF SUPPORTING DISCONTINUOUS OPERATION IN COMMUNICATION SYSTEMS USING VECTORING

REFERENCE TO RELATED APPLICATION

This application is a continuation of U.S. application Ser. No. 15/819,511 filed on Nov. 21, 2017, which is a continuation of U.S. application Ser. No. 14/890,173 filed on Nov. 10, 2015, which claims priority to PCT/EP2015/059736, filed on May 13, 2014, which claims priority to U.S. Provisional Application Ser. No. 61/822,478, filed on May 13, 2013, the contents of which are incorporated by reference in their entirety.

FIELD

The present application relates to methods, devices and systems relating to discontinuous operation in communication systems using vectoring.

BACKGROUND

Digital Subscriber Line (DSL) technology, like ADSL, ADSL2, VDSL, VDSL2 etc. up to the upcoming G.fast, during all its history, attempted to increase the bit rate in the aim to deliver more broadband services to the customer. Unfortunately, copper loops deployed from a Central Office (CO) to customer premises (CPE) are rather long and do not allow transmission of data with bit rates more than few Mb/s. To increase the bit rates, modern access networks use street cabinets, MDU-cabinets, and similar arrangements, generically also referred to as distribution points (DP) in this application: cabinets are connected to the CO by a high-speed backbone communication line, like multi-gigabit passive optical network (GPON) and installed close to the customer premises. From these cabinets or other DPs, high-speed DSL systems, such as Very-High-Bit-Rate DSL (VDSL), can be deployed. Current VDSL systems (ITU-T Recommendation G.993.2) have range of operation about 1 km, providing bit rates in the range of tens of Mb/s. To increase the bit rate of VDSL systems deployed from the cabinet, recent ITU-T Recommendation G.993.5 defined vectored transmission that allows increasing bit rates up to 100 Mb/s per direction.

Recent trends in the access communications market show that 100 Mb/s is still not sufficient and bit rates up to 1.0 Gb/s are required. This, based on current techniques, could be only achieved if copper pairs connecting the CPE as short as 50-100 m. Operation using so short loops requires installation of many small street/MDU cabinets called Distribution Points (DP) that intends to serve a very small number of customers.

Vectoring is used in systems operating from a DP, to reduce far-end crosstalk (FEXT), which is helpful for obtaining high bit rates. To perform vectoring, transmissions from all lines deployed from the DP are synchronized (i.e., all downstream transmission are aligned in time and all upstream transmissions are aligned in time). Further, in the downstream direction, vectoring is implemented by precoding the transmit signals (at the DP), so that each signal includes transmission of its own data and FEXT cancellation signals intended to compensate FEXT generated by other lines. In the upstream direction, the received signals from all lines are jointly processed at the DP to remove FEXT components (also referred to as crosstalk cancellation or equalization). Details of the described vectoring technique are defined e.g. in G.993.2 for VDSL2, but may be applicable to other communication protocols.

Operation using short loops requires installation of many small DPs that intend to serve a small number of customers, such as 8-16, as shown by recent analysis. In some cases, a higher number of served users, like 24 or even 32 may be present. Therefore, it would be helpful if DPs allowed very flexible installation practices: they should be light and easy to install on a pole or house wall, or basement, without air-conditioning. The most challenging issue for these flexible connection plans is providing DPs with power. The solution intended so far is so-called "reverse feeding" when the equipment of the DP is fed by the connected customer.

Small internal space of the DP and use of reverse power feeding may imply substantial restrictions on the power consumption of a DP. Therefore, special means to reduce power consumption have been developed and new ones are on development. This application mainly concerns one efficient method of power savings, called Discontinuous operation.

BRIEF DESCRIPTION OF THE DRAWINGS

In FIG. 5A, all lines are active, in FIG. 5B, one line is disabled.

In FIG. 7A, all lines are active, in FIG. 7B one line is disabled.

FIGS. 9A and 9B illustrate signal-to-noise ratio for a 16-line binder with equally distributed length from 50 meters to 250 meters with nonlinear precoding. In FIG. 9A, all lines are active, in FIG. 9B, two lines are disabled. The channel matrix has been updated, and disabled lines were the last ones added to the precoder.

Embodiments will be described in the following in detail with reference to the attached drawings. It should be noted that these embodiments serve as illustrative examples only and are not to be construed as limiting. For example, while embodiments may be described having numerous details, features or elements, in other embodiments some of these details, features or elements may be omitted and/or may be replaced by alternative features or elements. In other embodiments, additionally or alternatively further features, details or elements apart from the ones explicitly described may be provided.

Communication connections discussed in the following may be direct connections or indirect connections, i.e. connections with or without additional intervening elements, as long as the general function of the connection, for example to transmit a certain kind of signal, is preserved. Connections may be wireless connections or wire-based connections unless noted otherwise.

In some embodiments, efficient possibilities for updating vectoring coefficients, for example precoding coefficients, in systems using discontinuous operation may be discussed. For example, a precoder matrix may be updated based on actually active lines.

In other embodiments, other techniques may be employed.

Figure 1:
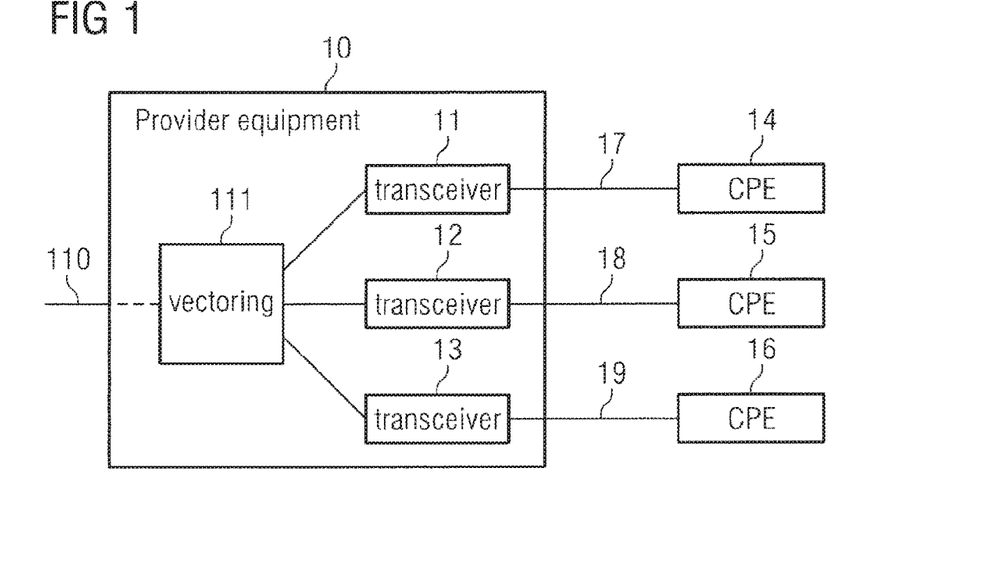
FIG. 1 illustrates a communication system according to some embodiments.

Turning now to the figures, in FIG. 1 a communication system according to an embodiment is shown. The system of FIG. 1 comprises a provider equipment 10 communicating with a plurality of CPE units 14-16. While three CPE units 14-16 are shown in FIG. 1, this serves merely as an example, and any number of CPE units may be provided. Provider equipment 10 may be central office equipment, equipment in a distribution point (DP), or any other equipment used on a provider side. In case provider equipment 10 is part of a distribution point, it may for example receive and send data from and to a network via a fiber optic connection 110. In other embodiments, other kinds of connections may be used.

In the embodiment of FIG. 1, provider equipment 10 comprises a plurality of transceivers 11-13 to communicate with CPE units 14-16 via respective communication connections 17-19. Communication connections 17-19 may for example be copper lines, e.g. twisted pairs of copper lines. Communication via communication connections 17-19 may be a communication based on a multicarrier modulation like discrete multitone modulation (DMT) and/or orthogonal frequency division multiplexing (OFDM), for example an xDSL communication like ADSL, VDSL, VDSL2, G.Fast etc., i.e. a communication where data is modulated on a plurality of carriers, also referred to as tones. In some embodiments, the communication system may use vectoring, as indicated by a block 111 (e.g. a crosstalk reduction circuit like a precoder or equalizer) in FIG. 1. Vectoring comprises joint processing of signals to be sent and/or received to reduce crosstalk.

A communication direction from provider equipment 10 to CPE units 14-16 will also be referred to as downstream direction, and a communication direction from CPE units 14-16 will be also be referred to as upstream direction. Vectoring in the downstream direction is also referred to as crosstalk precompensation, whereas vectoring in the upstream direction is also referred to as crosstalk cancellation or equalization.

Provider equipment 10 and/or CPE units 14-16 may include further communication circuits (not shown) conventionally employed in communication systems, for example circuitry for modulating, bit loading, Fourier transformation etc.

In some embodiments, communication via communication connections 17-19 is a frame-based communication. A plurality of frames may form a superframe. In some embodiments, the communication uses time division duplexing, as will be explained later.

Besides others methods, discontinuous operation, which is employed in some embodiments, is one of the ways to save power, e.g. in DSL lines. With Time Division Duplexing (TDD) transmissions in opposite directions alternate: the unit of transmission time, called TDD frame, is divided into two parts called Downstream Transmission Opportunity (DS_TO) and Upstream Transmission Opportunity (US_TO). The DS_TO is a time period when downstream transmission occurs, and US_TO is the time period when upstream transmission occurs. With discontinuous operation, when no data is available to be transmitted during the TO or a part of the TO, the transmitted simply stops transmission instead of filling up the time gap by idle symbols, as it is done in some conventional systems (frame padding).

Figure 2:
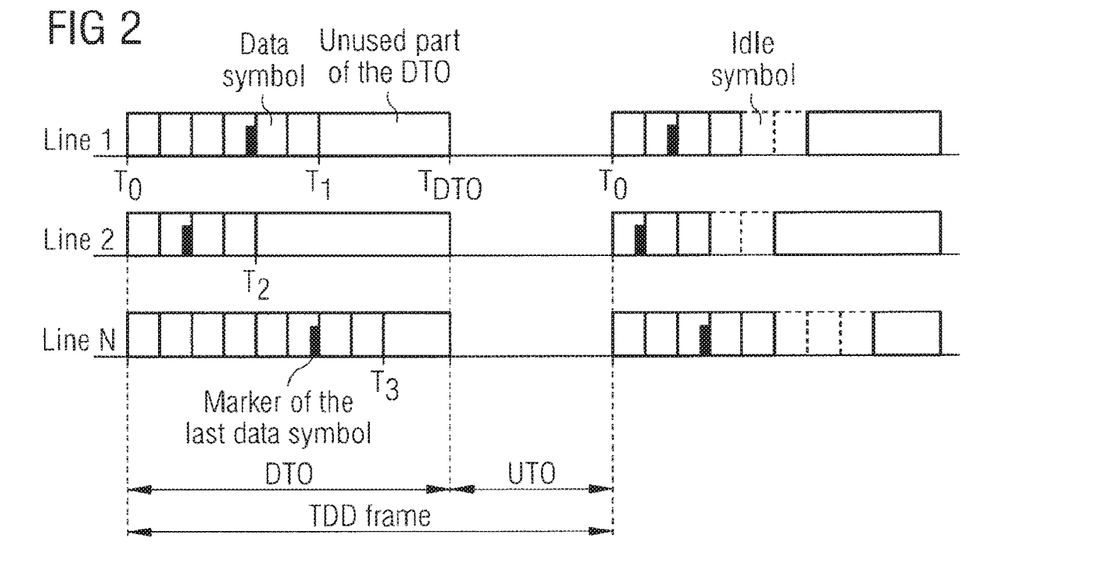
FIG. 2 is a diagram illustrating discontinuous operation.

With discontinuous operation the number of symbols transmitted in a particular line during a particular TDD frame may be different, which is illustrated in FIG. 2. FIG. 2 also shows markers that indicate when the active transmission will expire. Alternatively, the duration of the transmission in a number of consecutive TDD frames may be set in advance and indicated to the CPE during management communication (which indicates the number of transmitted symbols in a TDD frame). In this case Idle symbols (padding) will be added to frames in which the number of symbols required to transmit available data is less than the communicated value (shown in the right-hand side of FIG. 2 with dashed lines). It should be noted that markers and Idle symbols in embodiments are not supposed to be used at the same time).

Use of discontinuous operation in embodiments is beneficial for power savings, especially for services that have dynamically changing number of active users and bit rates. For ultra-high bit rate systems deployed from the DP, further below techniques will be presented to facilitate discontinuous operation with vectoring.

Discontinuous operation was previously proposed and defined. It provides an ability to transmit symbols only when there is user data available for transmission, while powers the line off when no data for transmission is available. Therefore, with discontinuous operation, the number of symbols transmitted over a particular line of a vectored group during a particular TDD frame is different. In this sense, if vectoring is used, the number of lines in the vectored binder is changing on a symbol-per-symbol basis and pre-coding/post-coding associated with vectoring may need to be updated on a symbol-per-symbol basis, which is equivalent of changing the set of lines of the vectored group every symbol. This very frequent update of the precoder in all lines in conventional approaches would require super-fast processing capabilities or big extra memory to store pre-computed precoder coefficients—both methods results in high power consumption and extra complexity.

Figure 3:
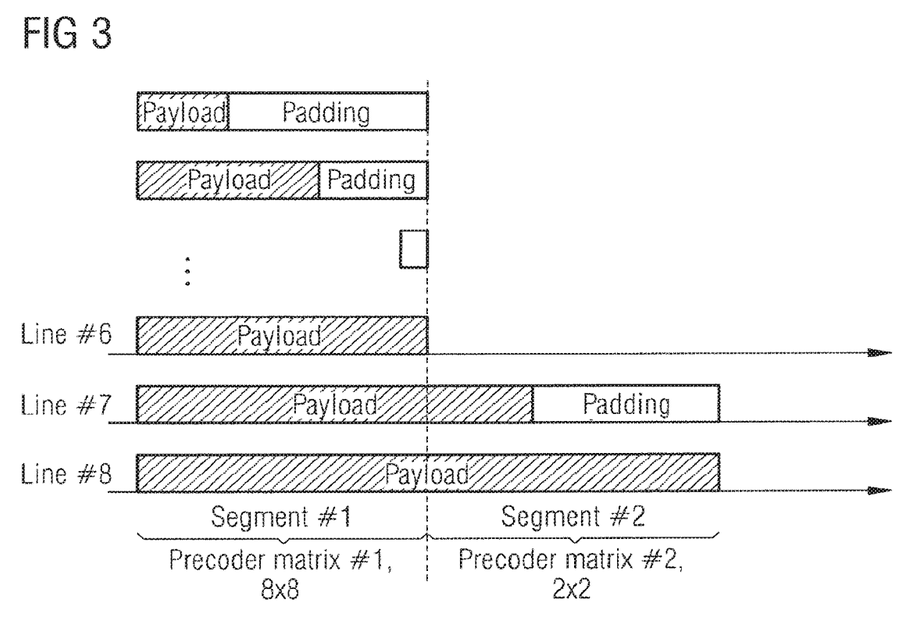
FIG. 3 illustrates transmission on a line using two sets of precoder matrices.

Another conventional approach, illustrated in FIG. 3, uses a second method, and in the aim to reduce the number of sets of coefficients to be stored, it proposes to group lines together, apply padding (to minimize the number of groups) and update precoding matrices small number of times (1-2) during the TDD frame (see FIG. 3).

In FIG. 3 there are two groups of lines, and padding symbols are added to establish small number of groups (e.g. 2-3) with same number of transmit symbols in each group. Idle symbols (padding) are transmitted with same power as regular data symbols, which reduces power savings in such an approach. In case the bandwidth of a particular line needs to be increased or substantially reduced, re-grouping is needed. The precoder matrices for each group may be stored and kept during the group assignment. This may limit the flexibility of such a conventional system, while padding itself may substantially reduce potential power savings.

In embodiments, a specific way of updating the precoder matrices (in the downstream direction) and decoder (post-coder) matrixes (in the upstream direction) are proposed, so that only few coefficients need to be updated and special order in the updating process allows almost no extra power and complexity. This way some embodiments avoid powerful computations (and high power consumption) and change the matrices on symbol bases without even re-computing matrix coefficients. This, in some embodiments, essentially provides a full flexibility in picking the number of transmit symbols in every TDD frame. The method according to some embodiments is reliable, guarantees quality of service (QoS), and provides efficient power saving at both DP and CPE.

Next, downstream vectored operation will be discussed.

Figure 4:
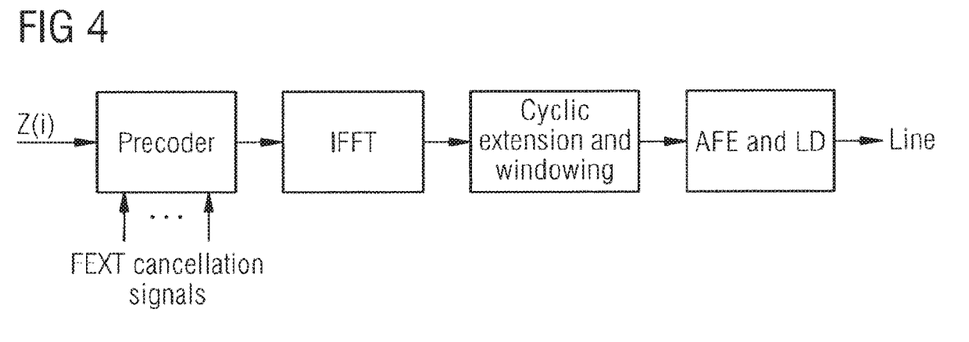
FIG. 4 illustrates a precoder of a single distribution point port according to an embodiment.

A functional model of downstream vectoring according to some embodiments is presented in FIG. 4 (LD stands for Line Driver, AFE for Analog Front End and IFFT for Inverse Fast Fourier Transform). A vectoring precoder is included into the transmitter to compensate FEXT (Far-End Crosstalk): one input of the precoder is the actual transmit signal for the line at tone i, Z(i), others are inputs are from other lines of the vectored group and intended for FEXT cancelling. The precoder applies inputs from other lines via precoding coefficients and special processing to compensate FEXT generated by other lines into line i.

Two types of precoders are conventionally employed: linear and nonlinear. With linear precoder, FEXT cancellation signals are added to the transmit signal Z(i) after multiplication on selected complex coefficients that represent FEXT coupling in the binder. With a nonlinear precoding, a nonlinear operation, such as MOD, is used to improve vectoring performance against noise.

If discontinuous operation is used, each line transmits different number of symbols in each TDD frame. That means that from a certain symbol (time instant $T_2$ for Line 2 in FIG. 2) the number of actual vectored lines changes—it may change after every symbol. When a line stops transmission (e.g., when Line 2 in FIG. 2 stops transmission at time $T_2$), this causes change in the FEXT generated into other lines, and the precoder coefficients (coefficients of the precoding matrix) in all other lines need to be updated to accommodate this change. Thus, precoding matrix may need to be updated every symbol in some cases.

The complexity and processing associated with the update may depend on the type of the precoding. In the worst case, precoding matrices of all remaining lines need to be obtained and stored at the transmitter prior the session, which requires big amount of memory to keep all the matrices associated with all possible symbol combinations. This doesn't seem to be practical. Thus, the above-described conventional approach uses line grouping and padding, as shown in FIG. 3, to leverage complexity increase.

It should be noted that switching of the lines ON and OFF during discontinuous operation should not involve substantial changes in the impedance of the line; if the impedance of the transmitter or receiver changes substantially, it may results in substantial changes of FEXT coupling between all lines in the binder (especially at high frequencies). This may require re-estimating the channel prior to the coefficient update, which is impossible to be done on symbol-by-symbol bases. Therefore, in the following description it is assumed no substantial impedance changes associated with ON/OFF during discontinuous operation, which assumption is at least in good approximation applicable to many practical situations.

If the impedance stays unchanged, removal of one or more lines from the vectored group may still cause very substantial performance degradation if the matrices of the remaining active lines are not updated. The particular value of the degradation depends also on the type of precoding.

Figure 5A:
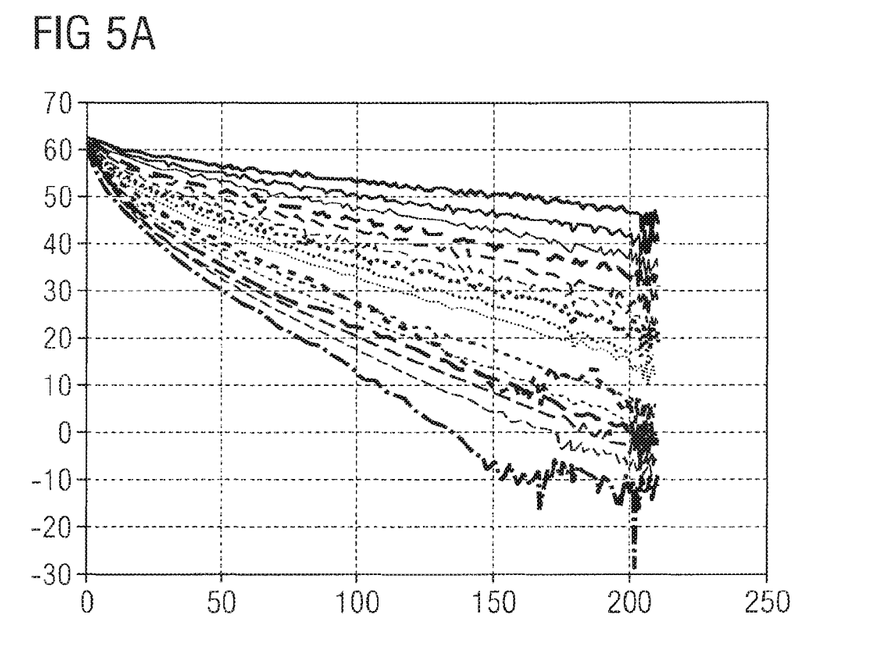
FIGS. 5A and 5B illustrate a simulation of signal-to-noise ratios for a 16 line binder with equally distributed lengths.
Figure 5B:
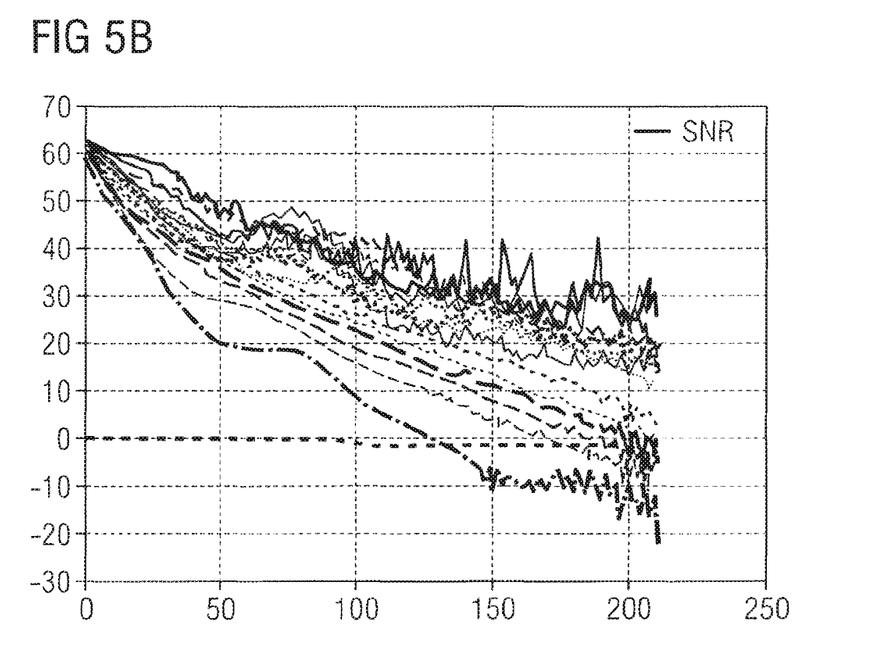

An example in FIG. 5 shows a simulation example for an SNR degradation in lines of a 16-line binder using linear precoding, caused by a removal of just one line—the SNR reduction in some lines is more than 10 dB, which is obviously unacceptable (FIG. 5A shows the SNR with all lines active, FIG. 5B the SNR with one line switched off.)

Figure 6:
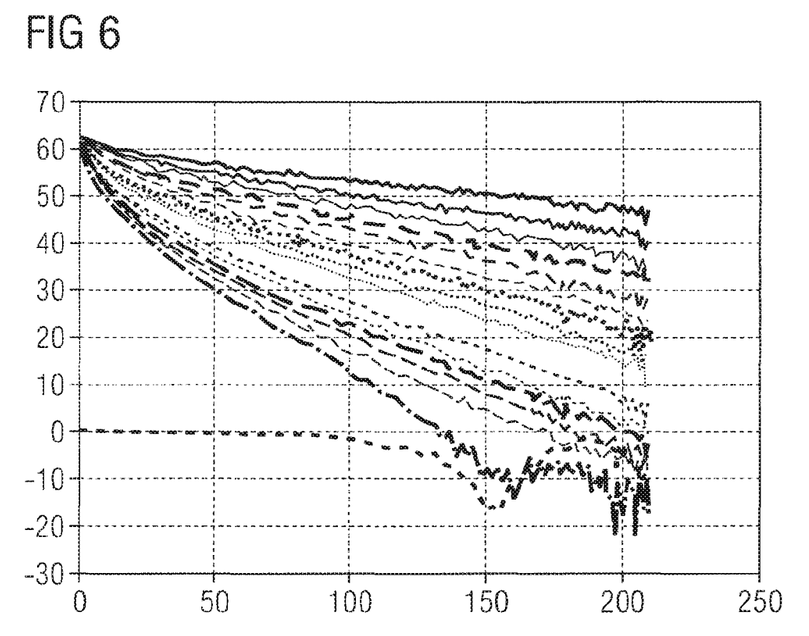
FIG. 6 illustrates behavior of the example of FIG. 5 after an update of matrix coefficients.

To improve the SNR again, an update of matrix coefficients is necessary. After the update of the relevant matrix coefficients, the SNR gets back, as it is shown in FIG. 6.

Figure 7A:
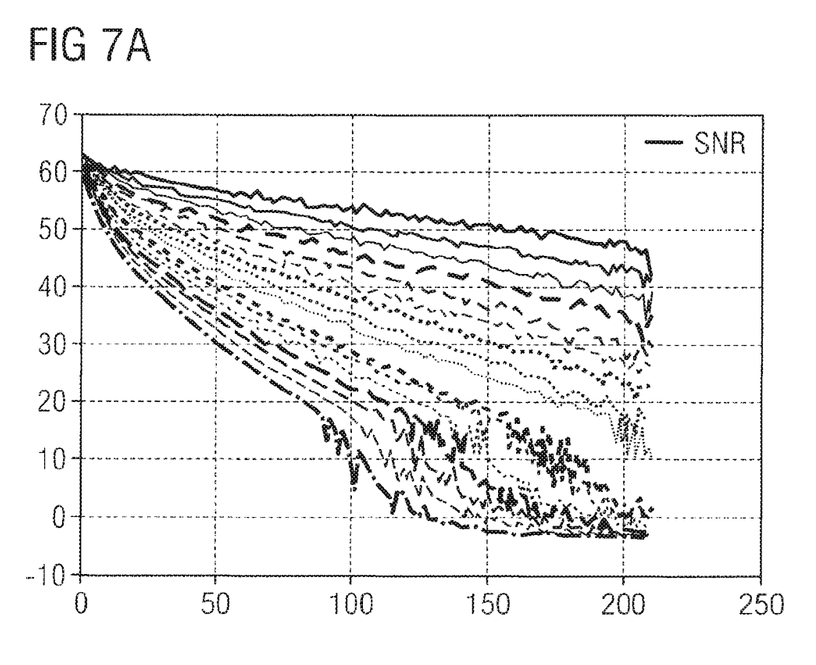
FIGS. 7A and 7B show signal-to-noise ratios for a 16 line binder with equally distributed lengths from 50 meters to 250 meters with nonlinear precoding.
Figure 7B:
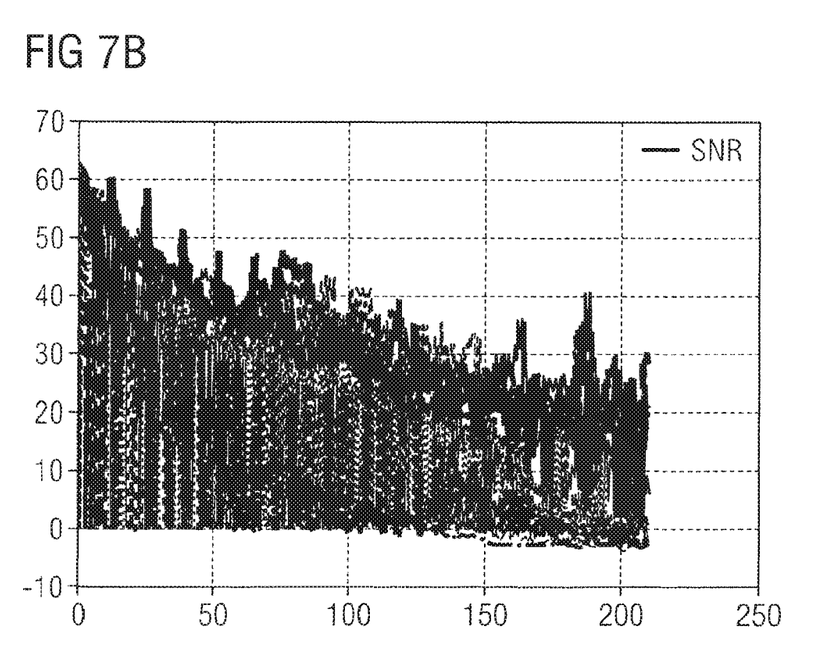

For the same 16-line binder using nonlinear precoding (Tom linson-Harashima vectored precoding, as proposed in some conventional approaches), the change of SNR after one line of the group is disabled is much more dramatic. The SNR degradation is shown in FIGS. 7A and 7B, FIG. 7A showing SNR before disabling of one line and FIG. 7B showing SNR after the disabling.

Next, discontinuous operation with linear precoder according to embodiments will be discussed.

Some embodiments are a method or a device having discontinuous operation and using linear precoder, which results in minimized number of computations for coefficient updates and thus can be performed on symbol bases in some embodiments.

With linear precoding, a received signal û can be presented as:

$$\hat{u} = H \cdot P \cdot u \quad (1)$$

where u is the transmit signal prior to precoding, H is a channel matrix, P is the precoder matrix. The frequency equalized (FEQ) matrix G is considered as a part of the channel matrix H to simplify equations.

If some lines are disabled in the aim to save power, the corresponding rows and columns from the channel matrix H and the precoder matrix P are set to zero.

Accordingly, we partition the matrix into matrixes of active (a) and of disabled (d) lines. Before deactivation of the line, for perfect crosstalk precompensation the following holds.

$$\begin{bmatrix} H_{aa} & H_{ad} \\ H_{da} & H_{dd} \end{bmatrix} \cdot \begin{bmatrix} P_{aa} & P_{ad} \\ P_{da} & P_{dd} \end{bmatrix} = \begin{bmatrix} I & 0 \\ 0 & I \end{bmatrix} \quad (2)$$

I is the unitary matrix with non-zero elements only in the main diagonal. With disabled lines (due to discontinuous operation), equation (2) must still be fulfilled, which requires a different matrix $P'_{aa}$.

$$H_{aa} \cdot P'_{aa} = 1 \quad (3)$$

Based on the matrix inversion lemma, equation (3) is found for the calculation of the matrix coefficients for active lines:

$$P'_{aa} = P_{aa} - P_{ad} \cdot P_{dd}^{-1} \cdot P_{da}. \quad (4)$$

With this simple coefficient re-computation, the matrix can be reduced to keep orthogonality after some lines have been disabled. For the case that only one line is disabled and the diagonal elements of P are equal to 1, the equation (4) simplifies to:

$$P'_{aa} = P_{aa} - P_{da} \cdot P_{ad}^T \cdot 1^{-1} \quad (5)$$

In case that the method is used for discontinuous operation, line deactivation is temporary and therefore a recomputation of the coefficients is disadvantageous. The operation of equation (5) can be, however, incooperated into the precoding operation (i.e., can be implemented by changing the order of multiplication and summation during precoding). This doesn't require additional computation resources.

For all active lines, we have $$x = P \cdot u \quad (6)$$

x being the transmit signal(s) after precoding. The transmit signal for a single line is given by equation (6):

$$x_i = p_i^T \cdot u \quad (7)$$

With one line deactivated, we get:

$$x_a = P_{ad} u_a - p_{da} \cdot p_{ad}^T \cdot u_a \quad (8)$$

Accordingly, for the remaining active lines, in case when one line is deactivated (discontinued), we have:

$$x_{ai} = p_{ia}^T \cdot u_a - p_{di} p_{ad}^T \cdot u_a \quad (9)$$

which uses the same precoder coefficients as when all lines are active.

Equation (9) shows that computation of the precoding output has the same number of multiply-accumulated (MAC operations) as when all lines are active since the value $P_{ad} \cdot u_a$ needs to be computed only once for all lines and needs to be scaled for each line differently by the corresponding coefficient $p_{id}$.

If more than one line is discontinued, equation (9) still holds because this can be seen as sequential deactivation of a number of single lines. Thus, when more than one line is deactivated, the number of MAC operations for the computation on the active lines is still the same.

An alternative to the sequential calculation is the inversion of the matrix $P_{dd}$ according to equation (10).

$$x_a = P_{ad} u_a - P_{da} \cdot P_{dd}^{-1} \cdot P_{ad}^T \cdot u_a \quad (10)$$

To avoid recalculation of the coefficients for $P_{dd}^{-1}$, the first order approximation of matrix inversion according to equation (11) can be used.

$$[P_{dd}^{-1}]_{ij} \approx \begin{cases} -p_{ddij} & \text{for } i \neq j \\ p_{ddij} & \text{for } i = j \end{cases} \quad (11)$$

With more than one line disabled, the assumption of 1 on the diagonal (result of initial PSD normalization) does no longer hold. Thus, this method may results in changes of the transmit PSDs (on the precoder output). Some lines transmit more power than before, while others transmit less. However, these PSD changes are rather small (~2-4 dB), and if lines are enable and disabled for rather short time and randomly, as takes place in discontinuous operation, the average spectrum does not increase.

Next, discontinous operation with nonlinear precoder will be discussed.

Figure 8:
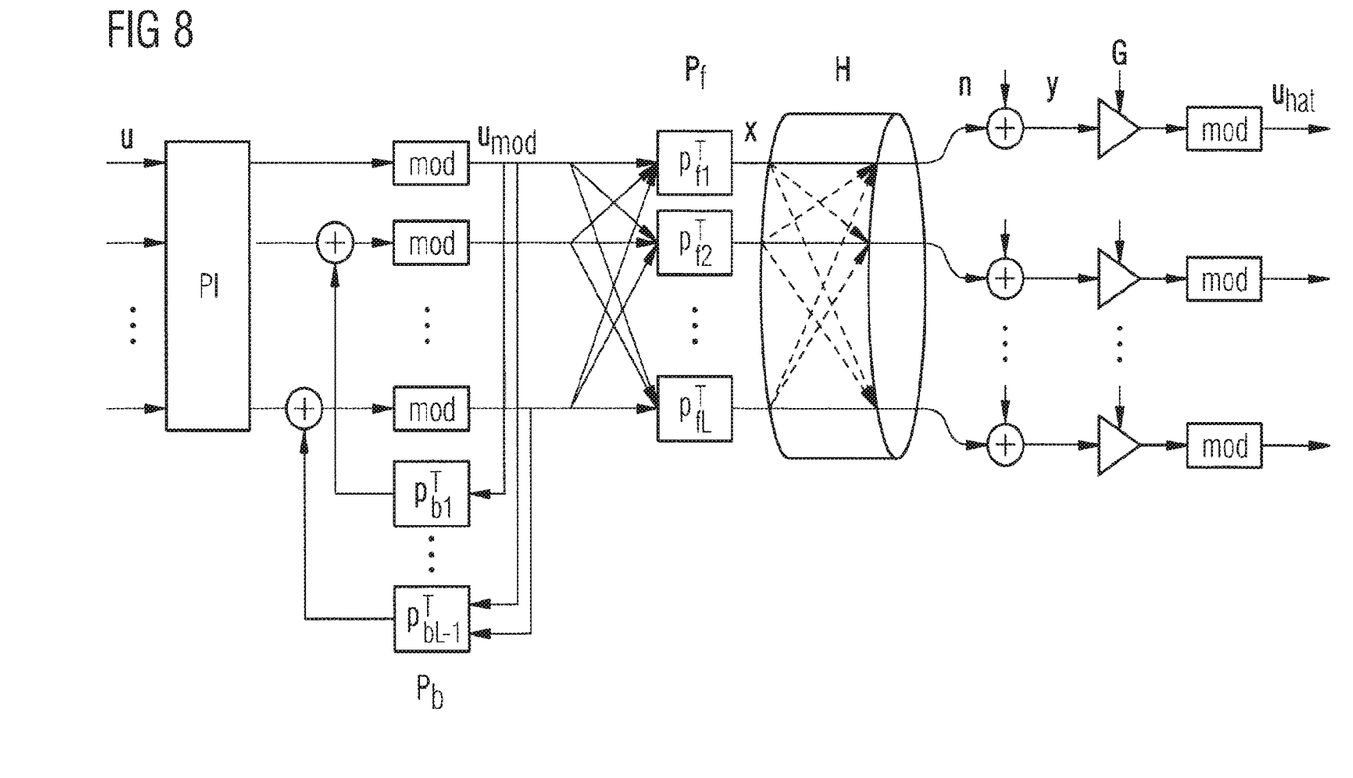
FIG. 8 illustrates a downstream system model with a Tomlinson-Harashima precoder.

The model of Tomlinson-Harashima nonlinear precoder is presented in FIG. 8 with a forward matrix $P_f$, a feedback matrix $P_b$ and an equalizer diagonal matrix G. n represents noise.

The nonlinear precoder matrices ($P_b$ and $P_r$) are given by equations (12) to (15) shown below. The coefficients are calculated based on the QR decomposition according to equation (12), where Q is a unitary matrix and R is an upper triangular matrix. The matrix Π is a permutation matrix defining the encoding order of the data streams.

$$Q \cdot R = (\Pi \cdot H \cdot \Pi^T)^T \quad (12)$$

$$P_f = \Pi T \cdot Q^* \quad (13)$$

$$P_b = I - \text{diag}(R)^{-1} \cdot R^T \quad (14)$$

$$G = \Pi^T \text{diag}(R)^{-1} \Pi \quad (15)$$

For discontinuous operation, in embodiments, the encoding order is selected such that the line that is disabled first is encoded first. By doing so, it is guaranteed that if the input signal of the disabled line is set to zero, a corresponding modulo output signal $u_{mod}$ is also equal zero and the nonlinear operation does not change.

So, if lines are discontinued in the order that is reversed to the order they were added to the precoding matrix, in embodiments, the impact on SNR of the remaining lines is much less dramatic than shown in FIG. 6 (right-hand side). The technique is possible if the duration of transmission over every line is known prior the start of the TDD frame (i.e., if matrix is computed prior time $T_0$ in FIG. 1 with known values of $T_1, T_2, \ldots T_N$).

However, in some cases there may still be an impact on performance. This is because the signal $u_{mod}$ at the output of the MOD (e.g. modulo) operation is transformed by the matrix $P_f$ and must be zero to avoid distortions caused by deactivation of the corresponding lines.

Therefore, some embodiments comprise replacing the signals of the lines which were transmitted prior to deactivation, which, in embodiments, is given by equation (16).

$$P'_{faa} = P_{faa} + H_{aa}^{-1} \cdot H_{ad} \cdot P_{fda} \quad (16)$$

In case that the precoder matrix $P_f$ shall not be changed, the operation according to equation (16) can be performed to calculate the transmit signal for the remaining active lines. In contrast to the linear precoder case, additional coefficients for the matrix ($H_{aa}^{-1} \cdot H_{ad}$) are required.

$$x_a = P_{fad} \cdot u_{mod\ a} + (H_{aa}^{-1} \cdot H_{ad}) \cdot P_{fda} \cdot u_{mod\ a} \quad (17)$$

This modification of the precoder matrix results in a change of the transmit PSD (Power Spectral Density), similarly as in the linear precoder case. Similarly as in case of linear precoder, this in embodiments is not expected to be harmful because the discontinued lines reduce the total power transmitted over the binder. After this update of the $P_f$, in an example scenario, the SNR got improved and recovered back to the values achieved before the discontinuous operation.

Figure 9A:
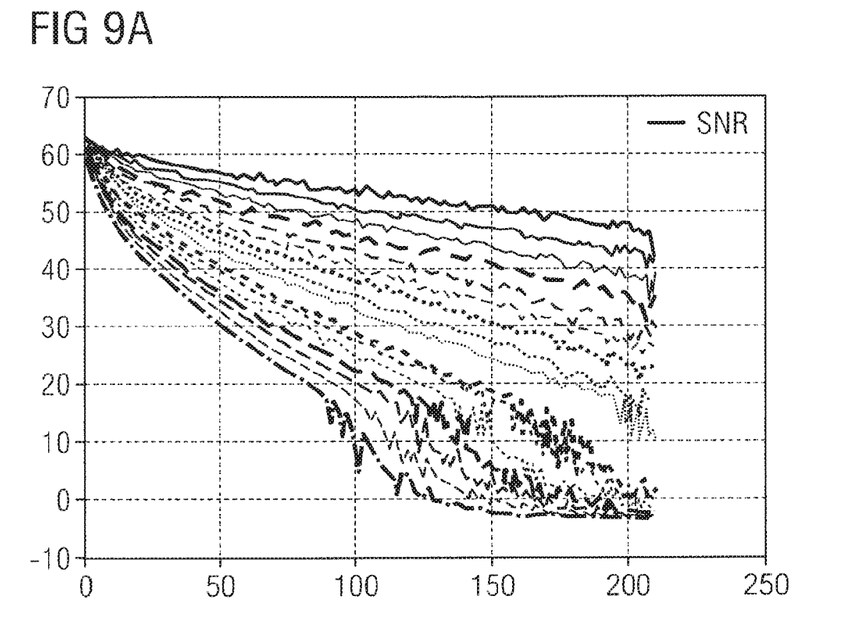
Figure 9B:
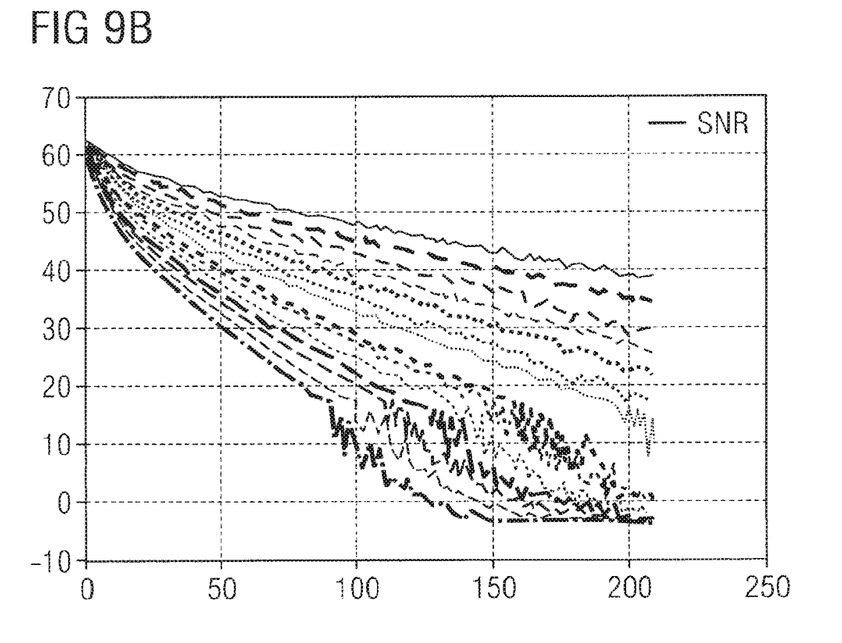

An example is shown in FIGS. 9A and 9B, FIG. 9A illustrating a case where all lines are active, and FIG. 9B illustrating a case where two lines were disabled and techniques as disclosed herein for updating coefficients where applied.

Next, upstream vectored operation will be discussed.

Figure 10:
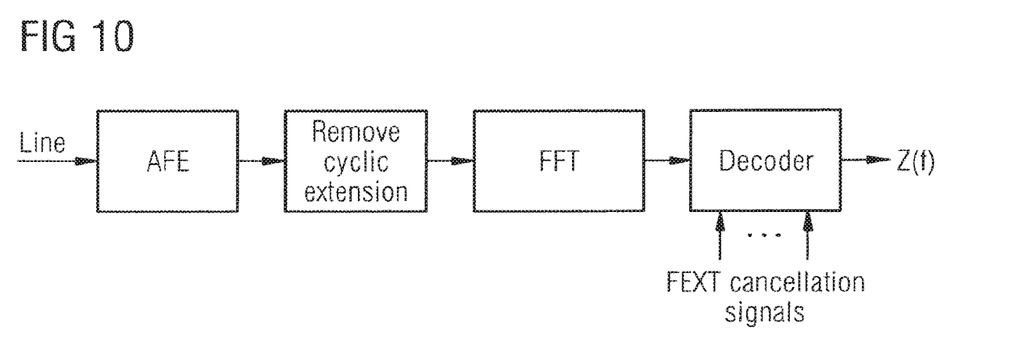
FIG. 10 illustrates a receiver of a single distribution point port according to an embodiment.

The functional model of the receiver (e.g. in a DP) is presented in FIG. 10. The output of the decoder is a composition of the signal received from the line and the sum of signals received from all other active lines multiplied by matrix coefficients, which corresponds to the aforementioned crosstalk cancellation or equalization.

If a receiver of a particular line is switched off, the corresponding input of the decoder is zeroed and FEXT components carried by the line are zeroed too. Therefore, similarly to the case of the downstream, the receiver shall update decoder matrix coefficients upon the number of actually transmitting lines changes. This is rather similar to the case of downstream. However, such coefficient recalculations, while greatly improving SNR related to FEXT, may, in some cases, result in an increase of background noise in some lines. At least for most relevant cases, this is expected to be insignificant (in fact, for most relevant cases the background noise will decrease).

Next, update of decoder matrix coefficients for crosstalk cancellation or equalization will be discussed.

For the following analysis we assume that when discontinued operation is used, the input of the decoder from the disabled line will be zero (the receiver is switched off, however in the way that the impedance of the line doesn't change (to avoid changes in FEXT coupling).

The coefficients of the updated matrix in some embodiments can be found in the way that is similar to the downstream:

Upstream model similar to equation (1):

$$\hat{u} = G \cdot H \cdot u \quad (18)$$

Here, the equalizer matrix G has non-zero nondiagonal elements and is used for crosstalk cancellation. Coefficient correction of the decoder similar to equations (4, 18):

$$G'_{aa} = G_{aa} - G_{ad} \cdot G_{dd}^{-1} \cdot G_{da} \quad (19)$$

Correction of the receive signal instead of coefficient recalculation according to equation (19):

$$\hat{u}_a = G_{aa} y_a - G_{da} \cdot G_{dd}^{-1} \cdot G_{ad} \cdot y_a \quad (20)$$

This changes the noise environment, because the receive signal Y consists of received signal plus noise: H·u+n.

This noise increase can be compensated by temporary increase of the transmit PSD, or by bit loading change. For both cases additional protocol may be required in some embodiments.

In some embodiments, to avoid updating of the decoder matrix coefficients described above, the receiver is kept operating, so that FEXT signals accumulated by the line are added to the decoder. This requires AFE, FFT and precoder to be left ON. Same as in the downstream direction, the dynamic range of the AFE may be reduced if used frequency spectrum is limited to 100 MHz (none or very few pairs has close to negative or negative impulse-to-SNR ratio). This gives additional power saving.

Next, a fast power allocation update according to some embodiments will be described.

To avoid PSD increase in downstream and noise increase in upstream, a fast update of the transmit subcarrier gains can be used in some embodiments.

In the downstream direction, the transmit gains scale the input of the precoder such that the output of the precoder does not violate transmit PSD. The scale factor update for each configuration of inactive lines is pre-computed by the DP for the following TDD frames and communicated to the CPEs.

For the upstream direction, the CPEs receive the update of the subcarrier gains table for the configurations contained in the following TDD frames. For frequencies up to 100 MHz where the direct channel can be assumed to be the strongest path between transmitter and receiver, this scaling will increase performance on average.

In one embodiment that involves a linear precoder, the transceiver at the DP computes the precoder matrix and normalizes the PSD at an initialization of the vectored group. Further, for each symbol position in each TDD frame, the DP updates the precoder matrix based on actually active lines using any method as described above. Similarly, the DP computes the decoder matrix during the initialization and updates it on symbol-to-symbol bases using any method as described above.

The DP may adjust transmit PSD normalization if one or more lines are turned to a long term deactivation. Bit loading adjustment in the downstream direction may be a part of this procedure.

Figure 11:
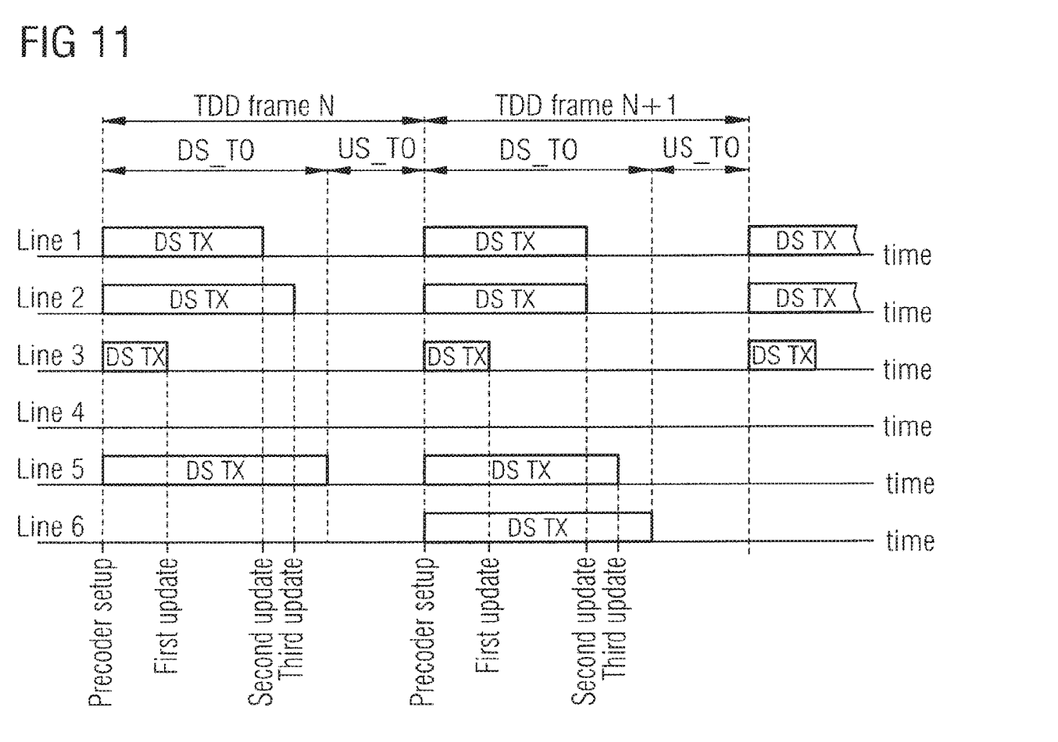
FIG. 11 is a diagram illustrating precoder settings and updates in a downstream direction.

In another embodiment that involves a linear precoder, the DP re-computes precoder coefficients and updates PSD normalization at the start of each TDD frame or a group of same TDD frames (TDD superframe), FIG. 10, taking in account all active lines for a particular TDD frame (lines 1-3 and 5 in Frame N of FIG. 11) or for a particular group of TDD frames. For the example in FIG. 10, the DP performs 3 updates of the precoder matrix based on actually active lines using the method defined in section 5.1.2. The upstream decoder matrix may be updated on symbol-to-symbol bases using any method as described above.

The PSD normalization may be performed in the range that allows to keep the same bit loading; otherwise bit loading may need to be adjusted for the TDD frame or group of TDD frames.

In another embodiment that involves a nonlinear precoder, the DP re-computes precoder coefficients at the at the start of each TDD frame or each group of same TDD frames (superframe) in the order lines are discontinuous during the TDD frame. For the scenario in FIG. 11, for TDD frame N lines may, e.g., be precoded in order: #5, #2, #1, #3, and for TDD frame (N+1) they will be precoded in order: #6, #5, #2, #1, #3. At each update the DP also modifies appropriately the feed-forward matrix $P_f$ using any method defined above.

The PSD normalization may be performed in the range that allows to keep the same bit loading; otherwise bit loading may need to be adjusted. This is usually only possible for a group of same TDD frames, so the PSD normalization can be pre-computed and bit loading changes may be exchanged with the CPE.

In another embodiment, to update the precoder for a group of same TDD frames, padding is added to some transmissions of some frames. In all the mentioned embodiments no action from the receiver is required except when bit loading or subcarrier gains are modified. Method of exchanging new values of bit loading and gains may be trivial and is beyond the scope of this invention.

Embodiments introduce special precoding update techniques (methods and algorithms) and a protocol associated with these updates. The proposed embodiments may serve as a part of the new G.fast standard.

In some embodiments, a vectored transmission correction network that employs discontinuous operation is provided, wherein a method or device updates precoder matrices and decoder or postcoder matrices such that a subset of coefficients needs to be updated.

The above described embodiments serve only as examples, and other techniques may be used as well.

What is claimed is:

1. A device arranged to transmit data in a discontinuous operation network, the device configured to:
   transmit on any of a plurality of lines symbols corresponding to the data during a transmission opportunity of a time division duplex (TDD) frame;
   transmit on any one of the plurality of lines in a discontinuous operation mode quiet or idle symbols when no data is available for transmission on that one of the plurality of lines;
   perform crosstalk reduction of the plurality of lines in a vectored group using a crosstalk reduction circuit; and
   update precoding coefficients for crosstalk reduction based on precoding coefficients used for a previous crosstalk reduction in case of a change of composition of the vectored group in the discontinuous operation mode.

2. The device of claim 1, comprising a crosstalk precoder to perform the crosstalk reduction by precompensating crosstalk prior to transmitting signals via the lines of the vectored group.

3. The device of claim 1, wherein the device is configured to perform the crosstalk reduction in a case, where only a subset of the lines are active.

4. The device of claim 3, wherein the crosstalk reduction is based on crosstalk reduction coefficients for a case where all of the lines are active.

5. The device of claim 1, wherein the device is configured to use precoder coefficients of a disabled line to estimate an effect on crosstalk without the disabled line.

6. The device of claim 1, wherein the device is arranged as a distribution point.

7. The device of claim 1, wherein the device is configured to modify bits or gains during discontinuous operation based on which lines are transmitting and which are not.

8. The device of claim 1, wherein the device is configured to transmit the quiet symbols during discontinuous operation with zero power.

9. A method to transmit data in a discontinuous operation network, the method comprising:
- transmitting on any of a plurality of lines symbols corresponding to the data during a transmission opportunity of a time division duplex (TDD) frame;
- transmitting on any one of the plurality of lines in a discontinuous operation mode quiet or idle symbols when no data is available for transmission on that one of the plurality of lines;
- performing crosstalk reduction of the plurality of lines in a vectored group using a crosstalk reduction circuit; and
- updating precoding coefficients for crosstalk reduction based on precoding coefficients used for a previous crosstalk reduction in case of a change of composition of the vectored group in the discontinuous operation mode.

10. The method of claim 9, further comprising performing the crosstalk reduction in a case, where only a subset of the lines are active.

11. The method of claim 10, wherein the crosstalk reduction act is based on crosstalk reduction coefficients for a case where all of the lines are active.

12. The method of claim 9, further comprising estimating an effect on crosstalk using precoder coefficients of a disabled line.

13. The method of claim 9, further comprising modifying bits or gains during discontinuous operation based on which lines are transmitting and which are not.

14. The method of claim 9, further comprising transmitting the quiet or idle symbols during discontinuous operation with zero power.

* * * * *